(No Model.)
W. G. HIMROD.
SHAFT COUPLING FOR VEHICLES.
No. 429,275. Patented June 3, 1890.
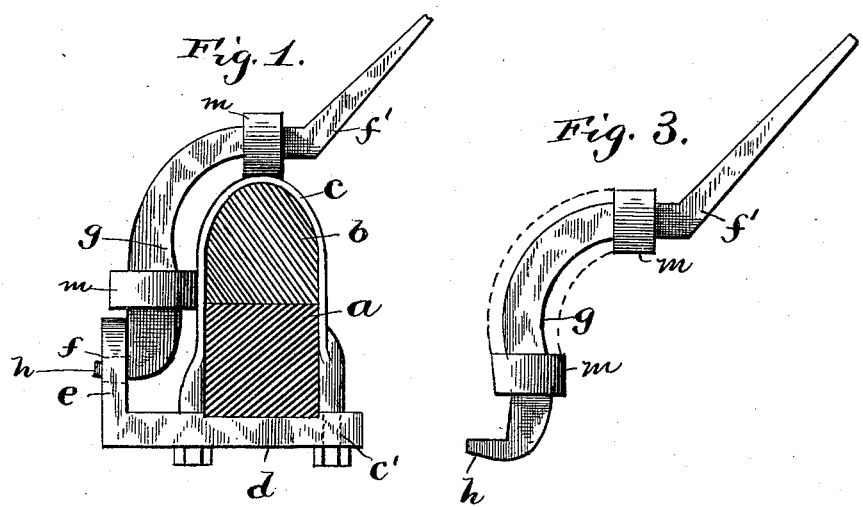
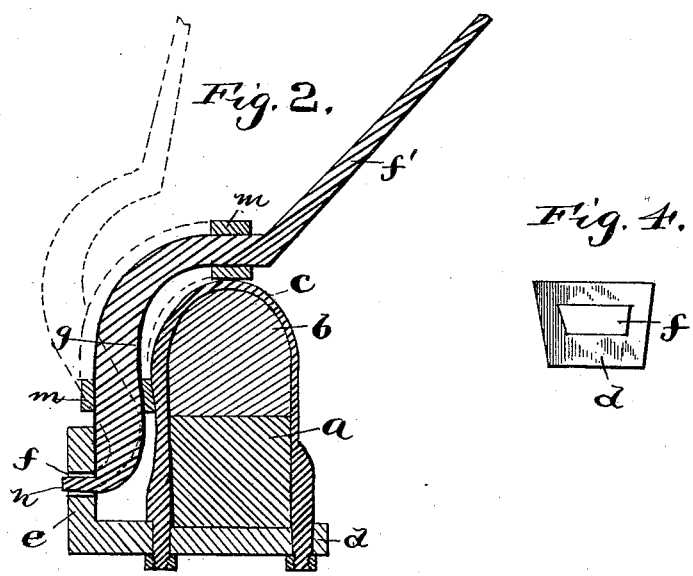

UNITED STATES PATENT OFFICE.

WILLIAM G. HIMROD, OF HAVRE DE GRACE, ASSIGNOR OF ONE-HALF TO HENRY H. KLINEFELTER AND WILLIAM E. KLINEFELTER, OF BALTIMORE, MARYLAND.

SHAFT-COUPLING FOR VEHICLES.

SPECIFICATION forming part of Letters Patent No. 429,275, dated June 3, 1890.

Application filed November 6, 1889. Serial No. 329,462. (No model.)

*To all whom it may concern:*

Be it known that I, WILLIAM G. HIMROD, a citizen of the United States, residing at Havre de Grace, in the county of Harford and State of Maryland, have invented certain new and useful Improvements in Pole and Shaft Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in shaft or tongue coupling and anti-rattlers for vehicles; and it consists in certain novel features of construction and in combination of parts more fully described hereinafter, and particularly pointed out in the claims.

Referring to the accompanying drawings, Figure 1 is a cross-section of a carriage-axle, showing the shaft-coupling in elevation. Fig. 2 is a cross-section of Fig. 5 on lines $x$ $x$, the coupling parts being in section and the shaft shown raised in dotted lines. Fig. 3 is a detail of the arm secured to the end of the vehicle shaft or tongue; Fig. 4, a detail of end plate; Fig. 5, a top view of the coupling.

On the drawings, the reference-letter $a$ indicates an axle of the vehicle. $b$ is the wooden backing therefor, and $c$ the clips passing around and at their lower ends passing through holes $c'$ in the front portion of the bearing-plate $d$, at its front end bearing and clamped against the under side of the axle by means of the usual nuts on the lower ends of the clip's legs, as clearly shown, and this bearing-plate extends rearwardly a suitable distance and thence upwardly to form a vertical portion $e$, located a distance from the rear side of the axle, and this upright portion is provided with one or more transverse openings $f$, located in a horizontal plane a distance below the top of the axle-backing.

The rear ends of the vehicle-shafts are each provided with a strong metal-arm extension $f'$, rigidly bolted at its front end thereto and consisting of a straight horizontal portion secured to the shaft and extending rearwardly and movably resting on the top edge of axle-backing and from thence curving downwardly to form the shoulder $g$ to bear against the rear side or face of said backing and receive the draft on the shafts, and at its lower end provided with the rearwardly-extending arm $h$, formed at its rear end to loosely enter said transverse opening or openings in the bearing-plate $d$, and thereby secure the shaft in position. By an adjustment of the anti-rattler the pole or shaft can be allowed to touch the ground when the horses are removed, or held up in a horizontal position, as shown in Fig. 1, thereby overcoming many disadvantages of the present couplings.

When it is desired to release the shafts, it can be done by raising the same into an upright position and the slipping of the end of the shafts' arms from the holes in the bearing-plate $d$.

To prevent rattling, a rubber tube $m$ or one or more rings, as shown, is slipped over each shaft or arm, so as to cover all portions thereof which come in contact with the axle or spring placed between, and hence prevents noise and wear and jar of the parts, said spring forming a cushion that relieves jar and eases draft.

This device is adapted for a single pole or tongue, or for shaft, which allows speedy exchange.

Of course it will be understood that the invention may be modified more or less without departing from the essential features of the present invention. I have shown and set forth that form of device which is at present preferred but do not wish to be limited exactly thereto. The coupling, as shown, can be detachable, used in other ways, and it is not limited to any particular style of vehicles, but can be used on the common style of wagons and carriages now in use. So, too, the rearwardly-projecting arm can be shaped and the parts can be connected with the clip $d$ other than that shown.

What I claim is—

1. The combination, with a vehicle-axle, of a shaft or tongue loosely coupled to the axle at the rear side of the same, so that the draft will be against said rear side, substantially as set forth.

2. The combination, with an axle and plate extending rearwardly from the same, of a tongue or shaft provided with rearwardly-extending arms having a shoulder to bear against the rear side of the axle and be loosely held by the said plate, substantially as set forth.

3. The combination, with a vehicle shaft or tongue, of an arm on the rear end of the same having a shoulder to engage with the rear side of the front axle, and means to loosely secure the said arm thereto, substantially as set forth.

4. A coupling and anti-rattler, comprising an arm on the end of the vehicle shaft or tongue, having a shoulder to engage the rear side of the front axle, a rubber or elastic tube or packing on said arm or spring between, and a plate secured to the axle, into which the rear end loosely fits, substantially as set forth.

5. The combination of a plate secured to and extending rearwardly from the front axle and having an upward extension at its rear end and provided with one or more apertures, an arm extending rearwardly from the shaft or tongue, and having a shoulder to engage the rear side of the axle, and having its rear end loosely fitted in said apertures, substantially as set forth.

6. A coupling provided with an anti-rattler spring or rubber forming a cushion and which also relieves the sudden concussion with obstacles in the roadway, said cushions being on the shoulder that engages with the rear side or face of the axle-backing, and a plate that is secured to the axle and extending rearwardly to admit the arm $f$, substantially as and for the purposes set forth.

In testimony whereof I affix my signature in presence of two witnesses.

WILLIAM G. HIMROD.

Witnesses:
J. B. McGin,
D. H. Curry.